United States Patent
Do et al.

(10) Patent No.: US 7,223,482 B2
(45) Date of Patent: May 29, 2007

(54) PHOSPHOR FOR A PLASMA DISPLAY DEVICE COATED WITH A CONTINUOUS THIN PROTECTIVE LAYER AND METHOD OF MANUFACTURE

(75) Inventors: Young-rag Do, Seoul (KR); Do-hyung Park, Suwon (KR); Yong-seon Kim, Suwon (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 09/951,748

(22) Filed: Sep. 14, 2001

(65) Prior Publication Data

US 2002/0039665 A1   Apr. 4, 2002

(30) Foreign Application Priority Data

Sep. 29, 2000  (KR) ............... 2000-57339

(51) Int. Cl.
*H01L 51/50* (2006.01)
*H05B 33/00* (2006.01)
*B32B 9/00* (2006.01)
*B32B 19/00* (2006.01)

(52) U.S. Cl. ............... 428/690; 428/917; 252/500; 252/508

(58) Field of Classification Search ............... 428/690, 428/917, 66; 252/500, 508; 427/66
See application file for complete search history.

(56) References Cited

U.S. PATENT DOCUMENTS

| | | | | |
|---|---|---|---|---|
| 2,151,496 A | 3/1939 | Beese et al. ............... 176/122 |
| 4,287,229 A | 9/1981 | Watanabe et al. ............. 427/64 |
| 4,339,501 A | 7/1982 | Inoue et al. ................. 428/404 |
| 4,585,673 A | 4/1986 | Sigai ........................... 427/213 |
| 4,710,674 A | 12/1987 | Sigai ........................... 313/489 |
| 4,825,124 A | 4/1989 | Sigai ........................... 313/486 |
| 5,196,229 A | 3/1993 | Chau ........................... 427/66 |
| 5,289,081 A | 2/1994 | Tamatani et al. ........... 313/487 |
| 5,418,062 A | 5/1995 | Budd ........................ 428/403 |
| 6,197,218 B1 * | 3/2001 | Hampden-Smith et al. ................... 252/301.4 R |
| 6,811,813 B1 * | 11/2004 | Tian ............................ 427/215 |

OTHER PUBLICATIONS

The Merck Index, Copyright 2001-2005, "Aluminum Oxide", 1 page.*
The Merck Index, Copyright 2001-2005, "Silicon Oxide", 1 page.*

* cited by examiner

*Primary Examiner*—Dawn L. Garrett
(74) *Attorney, Agent, or Firm*—H.C. Park & Associates, PLC

(57) ABSTRACT

Phosphor coated with wide bandgap metal oxide which can be used for a plasma display panel (PDP) has a surface that is coated with a continuous, thin film of wide bandgap metal oxide. In preparing the phosphor coated with wide bandgap metal oxide, a pH of the wide bandgap metal oxide precursor solution containing an organic solvent and water is adjusted to 0.1–10 and heated under a reflux, thereby obtaining a metal hydroxide gel. The wide bandgap metal hydroxide gel is made to contact a phosphor for a PDP, thereby obtaining the gel-coated phosphor. The gel-coated phosphor is then dried and sintered.

19 Claims, 8 Drawing Sheets

PHOSPHOR FOR A PLASMA DISPLAY DEVICE COATED WITH A CONTINUOUS THIN PROTECTIVE LAYER AND METHOD OF MANUFACTURE

CROSS-REFERENCE TO RELATED APPLICATIONS

This application claims the benefit of Korean Application No. 2000-57339, filed Sep. 29, 2000, in the Korean Industrial Property Office, the disclosure of which is incorporated herein by reference.

BACKGROUND OF THE INVENTION

1. Field of the Invention

The present invention relates to a phosphor which is coated with a protective layer and which can be used for a plasma display panel (PDP), and more particularly, to a phosphor used for a PDP and coated with a continuous, thin protective layer, thereby improving the optical characteristics and the lifetime of the PDP.

2. Description of the Related Art

Since a PDP self-radiates on a similar principle to a fluorescent lamp, an image shown on the PDP has a uniform brightness, a relatively high contrast, and a viewing angle greater than 160 degrees even if a screen of a PDP is large. The PDP is known to best display a large screen of 42–60 inches. In addition, a PDP has upper and lower glass plates and a thickness no greater than 10 cm even if a driving circuit is provided, and is very light as compared to other display devices. Therefore, PDPs have been considered as the next generation of display devices.

The gradation of a cathode-ray tube (CRT) is determined in accordance with the energy of an electron beam incident on the surface of the phosphor. In contrast, a PDP adjusts the gradation using the number of discharges. In other words, the display operation of a PDP is performed only by an ON/OFF of a discharge, and a discharge "ON" state can be implemented when the voltage is higher than a predetermined level.

In the case of PDPs, since the surface of the phosphor is exposed to a discharge and vacuum ultraviolet (VUV) rays under discharge conditions, the luminance, the luminescence, and the life characteristics decrease as time elapses. To overcome this problem, the surface of the phosphor is coated with a material, such as $Al_2O_3$ or $Y_2O_3$, having a wide band gap as a protective layer. However, most protective coatings are particulate coatings in which a protective material is discontinuously deposited on the surface of the phosphor in the form of particles, but not in the form of a continuous film. Such a particulate coating is known to greatly decrease the luminance. Particularly, in the case of the phosphor for a PDP, since an exciting source is a VUV ray (147 nm), the depth of penetration provoking the luminescence is only several hundred nanometers. Accordingly, such a decrease in luminance is great. Consequently, particulate coatings used at present do not satisfactorily serve as a protective layer and greatly decrease the optical characteristics so that their practical use is problematic.

To prevent the optical characteristics of the phosphor from decreasing due to a particulate coating and to improve the lifetime of the phosphor, a protective coating to efficiently protect the phosphor from sputtering that occurs during the discharge and the VUV rays is needed.

In addition, efforts to form a continuous coating layer on the surface of an individual phosphor particle have been made to improve the performance of a lamp for maintaining luminance. For example, U.S. Pat. Nos. 4,585,673, 4,710,674, and 4,825,124 disclose methods of depositing a continuous coating layer on a phosphor particle within a fluidized bed. However, these methods require a very sophisticated apparatus. Other methods of forming a continuous layer on phosphor are deep coating, vaporization, and drying methods that are disclosed in U.S. Pat. Nos. 2,151,496, 4,287,229, and 4,339,501. Particularly, U.S. Pat. No. 4,339,501 discloses a method of forming a continuous silica film by treating the phosphor for a CRT with a solution obtained by dissolving silica in an organic alkali solution.

In addition, U.S. Pat. No. 5,196,229 discloses a method for improving and maintaining the luminance of the phosphor for a fluorescent lamp by suspending phosphor particles in a solution containing a metal alkoxide, such as an isopropoxy or an ethoxy compound, which is then caused to gel into a gelled suspension. The gelled suspension is aged and/or dried to form a dried cake which can be readily broken up into powder. During the gelling and drying processes, the alkoxide hydrolyzes and polymerizes and reacts to form an oxide coating on each of the phosphor particles. However, U.S. Pat. No. 5,196,229 discloses forming a continuous coating film for a type of the phosphor, such as a type 4450 phosphor (for example, calcium fluorochlorophosphate activated by antimony and manganese), zinc silicate phosphor, and zinc sulfide EL phosphor, that is used only in fluorescent lamps.

Consequently, there is no known method of forming a continuous, protective coating on the surface of the phosphor used in a PDP, which has different luminescent characteristics than the phosphor used in a fluorescent lamp, where the coating is formed using a sol-gel process.

SUMMARY OF THE INVENTION

To solve the above-described and other problems, it is an object of the present invention to provide a phosphor for a plasma display panel (PDP) which has a continuous, protective layer formed using a sol-gel process.

Additional objects and advantages of the invention will be set forth in part in the description which follows and, in part, will be obvious from the description, or may be learned by practice of the invention.

To achieve the above and other objects, a plasma display panel(PDP) according to an embodiment of the present invention includes a surface that is coated with a continuous, thin film of a wide bandgap metal oxide using a sol-gel process.

According to an aspect of the present invention, the phosphor for a PDP is blue phosphor, $BaMgAl_{10}O_{17}$:Eu.

According to another aspect of the present invention, the thickness of the continuous, thin film is 1–40 nm.

According to yet another aspect of the present invention, the sol-gel process includes preparing a wide bandgap metal hydroxide precursor solution containing an organic solvent and water, adjusting a pH of the precursor solution to a range of 0.1–10, heating the precursor solution having the pH in the range of 0.1–10 under reflux to hydrolyze a metal hydroxide precursor to obtain a metal hydroxide sol, making phosphor for a PDP contact the precursor solution by heating the precursor solution to obtain gel-coated phosphor, drying the gel-coated phosphor, and sintering the dried gel-coated phosphor.

According to still another aspect of the present invention, when the wide bandgap metal hydroxide precursor is a silicon hydroxide precursor, the pH is adjusted to a range of 4.0–10.0.

According to still another aspect of the present invention, when the wide bandgap metal hydroxide precursor is an aluminum hydroxide precursor, the pH is adjusted to a range of 0.1–6.5.

According to a further aspect of the present invention, the wide bandgap metal hydroxide precursor is silicon alkoxide or aluminum alkoxide.

According to a still further aspect of the present invention, the silicon alkoxide is tetraalkylorthosilicate having an alkyl substituent of 1 to 6 carbons.

According to a still further aspect of the present invention, the aluminum alkoxide has an alkyl substituent of 1 to 6 carbons.

According to a still further aspect of the present invention, the organic solvent is alcohol.

According to an additional aspect of the present invention, the heating the precursor solution includes adding an acid and a base to the wide bandgap metal hydroxide precursor solution to accomplish the hydrolysis.

According to a yet additional aspect of the present invention, the acid is at least one selected from a group consisting of acetic acid, nitric acid and hydrochloric acid, and the base is at least one selected from a group consisting of ammonia, ammonium hydroxide, and urea.

According to a still additional aspect of the present invention, the dried gel-coated phosphor is sintered at a temperature of roughly between 400–1200° C. for a time period ranged from 30 minutes to 6 hours.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Figure 1:
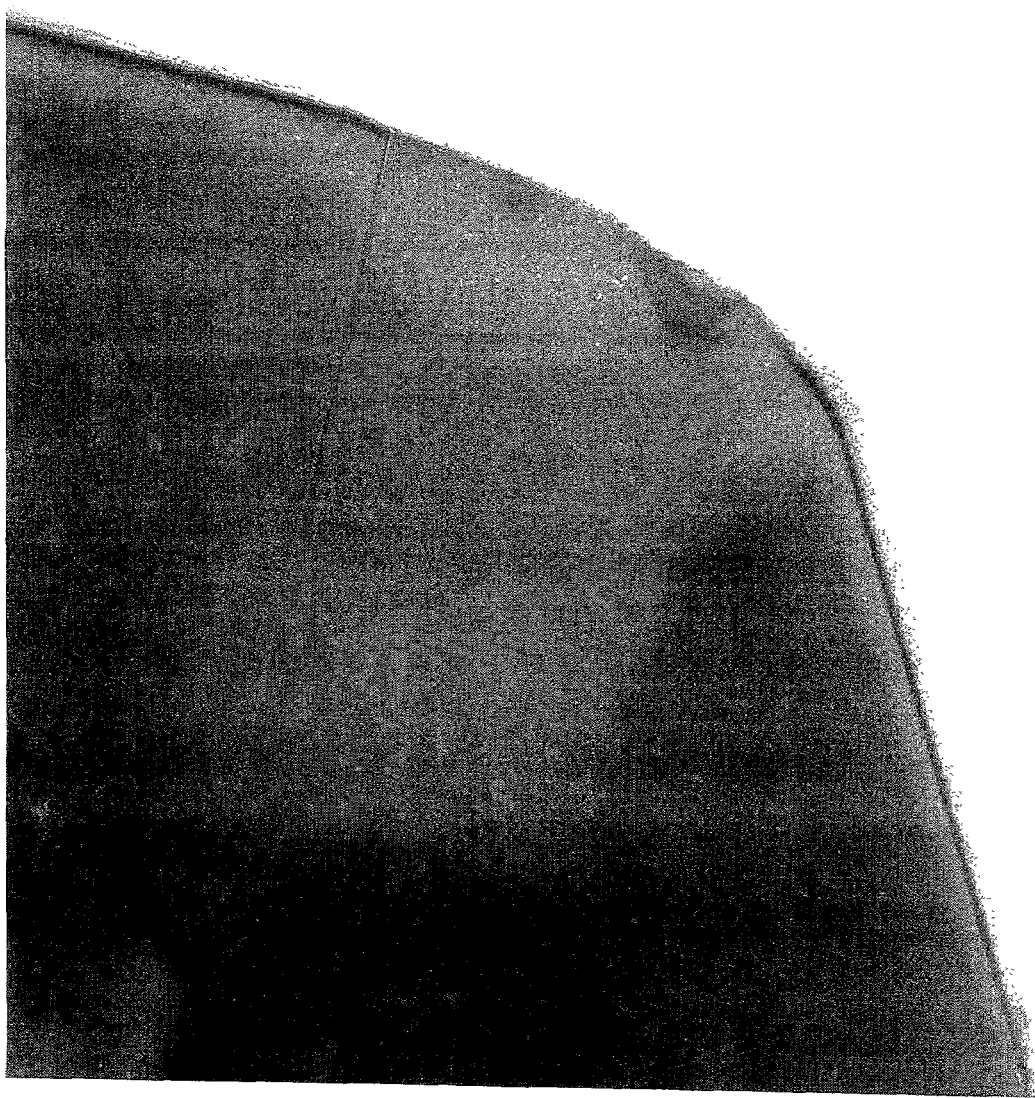
FIG. 1 is a transmission electron microscopy (TEM) analysis photograph of the phosphor prepared in Example 1 according to the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

The present invention is a surface-coated phosphor for a plasma display panel (PDP) having advantages such as an improved luminescent characteristic, resistance to aging, oxidation stability, and chemical stability, and has a protective layer formed on the surface of the phosphor in the form of a continuous, thin film. The continuous, thin film on the phosphor improves the life characteristic of the phosphor while preventing a decrease in the life characteristic due to a physical impact.

When the protective layer is formed in the form of a continuous, thin film according to an embodiment of the present invention, the film is of wide bandgap metal oxide, and preferably of silica ($SiO_2$) or alumina ($Al_2O_3$). The bandgap of silica and alumina is 8.9 eV and 9.0 eV respectively. However, it is understood that the film is not restricted to a wide bandgap metal oxide.

Metal oxide such as silica or alumina has advantages in having excellent chemical and/or oxidation stability, great depth of electron penetration, and a wide bandgap resulting in the great depth of electron penetration of a vacuum ultraviolet (VUV) ray.

Sol-gel chemistry is used to form the coating of wide bandgap metal oxide according to an embodiment of the present invention. For example, silicon alkoxide or aluminum alkoxide, which is used as a wide bandgap metal oxide precursor, is dissolved in water and/or an organic solvent and hydrolyzed to form sol. The sol is mixed with the phosphor and then vacuum dried. As a result, a continuous, thin film of wide bandgap metal oxide such as silica or alumina is formed on the surface of the phosphor. Thereafter, the phosphor having the continuous thin film of wide bandgap metal oxide is sintered together to further crystallize the coating.

The type of the phosphor can be appropriately chosen to be used with the continuous, thin film according to the present invention. For example, $BaMgAl_{10}O_{17}$:Eu may be used for blue phosphor.

The shape of the phosphor before being coated is not critical in all aspects of the present invention, and thus the phosphor may have any appropriate shape. For example, the phosphor may be a particulate powder, where the particles have a size of about 0.01–5 µm or greater.

The wide bandgap metal oxide coating may have any appropriate thickness. However, the wide bandgap metal oxide coating usually has a thickness of about 1 nm or greater. According to an embodiment of the present invention, the wide bandgap metal oxide coating has a thickness of about 1–40 nm, and according to another embodiment of the present invention, the wide bandgap metal oxide coating has a thickness of 3–20 nm. If the thickness of the wide bandgap metal oxide coating is less than 1 nm, then the coating cannot serve as a protective layer. If the thickness is more than 40 nm, then it is difficult to use as a phosphor since the luminescence decreases and aggregation occurs.

A wide bandgap metal hydroxide solution can be prepared by any appropriate method. For example, a precursor of the wide bandgap metal oxide is dissolved in a medium containing an organic solvent and then water is added. In another method, a precursor is dissolved in a medium containing an organic solvent and/or water.

Any appropriate wide bandgap metal oxide precursor may be used. For instance, the wide bandgap metal oxide precursor could be a silicon compound or an aluminum compound, and preferably, an organic silicon compound or an organic aluminum compound, which would provide the metal hydroxide sol and, eventually, the wide bandgap metal oxide. It is preferable to use a precursor that rapidly generates the hydroxide sol. It is more preferable to use a precursor having residue, like carbon residue, which can be readily removed by evaporation or oxidation. A preferred organic silicon compound or organic aluminum compound is an alkoxide compound such as silicon alkoxide or aluminum alkoxide. An appropriate silicon alkoxide or aluminum alkoxide contains an alkyl group having roughly 1–6 carbon atoms. An example of the preferred precursor is tetraethylorthosilicate, aluminum isopropoxide, or aluminum sec-butoxide.

A medium to dissolve the precursor includes an appropriate organic solvent or a mixture of an organic solvent. A polar organic solvent, such as alcohol, ketone, ester, or ether, is preferably used, with alcohol being more preferable. An appropriate alcohol includes lower alcohol, such as methanol, ethanol, isopropanol, or butanol. Ethanol, isopropanol, or a combination thereof is preferable.

The amount of the precursor to be dissolved depends upon several factors such as the surface area of the particle to be coated, the coordination number of an oxide to be formed, and the target wide bandgap metal oxide to be loaded. For example, the weight of the loaded target metal oxide is greater than 0.1%. According to an embodiment of the present invention, the weight is 0.5–20%, with respect to the weight of the coated phosphor. According to an embodiment of the present invention, the weight of the loaded target metal oxide is 2–15% with respect to the weight of the coated phosphor.

Next, the precursor solution is treated such that the dissolved metal can be ionized and hydrated. This may be implemented by hydrolyzing the precursor. The hydrolysis of the precursor may be performed by conventional methods. For example, the precursor solution containing water contacts an aqueous base or an acid. For example, the base or the acid is added to the precursor solution and then heated, and preferably, stirred intensely.

An appropriate aqueous base includes ammonia, ammonium hydroxide, and urea, and an appropriate acid includes acetic acid, nitric acid, and hydrochloric acid. Since urea releases ammonia when it is heated in an aqueous medium, ammonia can be easily provided to the solution by using urea. By adding urea, the temporary formation of a high-pH memory area due to the direct addition of an aqueous base can be suppressed. It is preferable to avoid high-pH conditions because it causes hydrated silicon anions to nucleate homogeneously.

It is preferable to use an excessive amount of water with respect to the silicon oxide in the hydrolysis. For example, the mol ratio of water to the precursor is about 10:1 or greater, preferably, about 100:1 or greater, and more preferably, about 100:1 to 300:1.

Heating the precursor solution can accelerate the hydrolysis. For example, the precursor solution can be heated at a temperature of about 40–100° C., and preferably, a temperature of about 50–85° C. According to another embodiment of the present invention, the precursor solution is heated at the reflux temperature of the organic solvent. Heating is performed until the hydrolysis is sufficiently done, and preferably, until the hydrolysis is completely done. Since the speed of the hydrolysis increases according to temperature, the heating time depends on the temperature. The higher the temperature, the shorter the heating time. The solution may be heated for about 0.1 hour or greater, for example, about 1–72 hours. It is preferable to heat the solution for about 10–30 hours. More preferably, the solution is heated for about 20–24 hours. However, it is understood that heating is not required in all aspects of the present invention.

The pH of the precursor solution containing wide bandgap metal hydroxide exerts an important influence on the quality of the resulting coating. More specifically, the wide bandgap metal hydroxide is preferably caused to nucleate heterogeneously in order to obtain a thin, smooth, and continuous coating. It has been confirmed that the heterogeneous nucleation can be obtained by adjusting the pH of the precursor solution of wide bandgap metal hydroxide to, for example, about 0.1–10.0. In particular, when the wide bandgap metal hydroxide precursor is a silicon hydroxide precursor, the pH is adjusted to 4.0–10.0, preferably, 5.0–8.0, and more preferably, a neutral pH range of about 7.0. When the metal hydroxide precursor is an aluminum hydroxide precursor, the pH is adjusted to 0.1–6.5, preferably, 0.5–3.5, and more preferably, a strong acidic pH range of about 2.0.

After completion of the hydrolysis, the phosphor contacts the metal hydroxide sol in the solution. The contact can be implemented by stirring the phosphor particles within the solution containing the silicon hydroxide gel. The sol-coated phosphor particles can be separated from the sol solution by, for example, evaporating the solvent, or filtering (or pouring) out the solution.

The sol-coated phosphor particles are dried to remove any absorbed solvent. For example, the particles may be dried at an ambient temperature (22±3° C.) or a little higher temperature. Accordingly, drying is performed at a temperature of about 30° C. or higher, that is, about 60–150° C., and preferably, about 80–120° C. Drying can be performed in an appropriate atmosphere, for example, air, vacuum, or an atmosphere containing an inert gas.

Next, the dried phosphor particles are sintered at a higher temperature. Such heat treatment increases the cohesion of the sol to the phosphor particle. A sintering temperature is about 200° C. or greater, for example, about 250–1300° C., and preferably, about 400–1200° C. Sintering can be performed in an appropriate atmosphere, for example, air, vacuum, or an atmosphere containing an inert gas or a reducing gas, for a time period ranged from 30 minutes to 6 hours. Preferably, the sintering is performed in a reducing atmosphere. However, it is understood sintering is not required in all aspects of the present invention.

The surface-coated phosphor according to the present invention has an improved optical characteristic after heat deterioration, in particular at most 27% increase in luminescence efficiency. The life characteristic thereof is also improved at least 10%.

Hereinafter, the present invention will be described by explaining examples. However, it is understood that the present invention is not limited to the examples.

EXAMPLE 1

12 g of tetraethylorthosilicate (TEOS) was dissolved in 1200 g of isopropanol to form a solution. 30 ml of water was added to the solution and stirred for one hour. To accelerate hydrolysis, the pH of the solution was adjusted to 2.0, 4.5, 7.0, 9.5 and 12.0 using acetic acid and ammonia. After adjusting the pH, the solution was refluxed for 24 hours.

The amount of TEOS was determined to provide 6.0 wt % of $SiO_2$ to be loaded based on the final weight of the phosphor. 100 g of blue phosphor ($BaMgAl_{10}O_{17}$:Eu) for a PDP was added to the solution and stirred for two hours. The phosphor obtained after evaporating the solution was dried at 100° C., thereby obtaining the coated phosphor. The coated phosphor particles were annealed in a graphite-reducing atmosphere at a temperature of 900° C. for one hour.

FIG. 1 is a TEM (transmission electron microscopy; JEM 2000FX1, JEOL) analysis photograph of the phosphor coated at a pH of 7.0. The darker portion denotes the phosphor particle. It can be confirmed that a continuous, thin film coating of $SiO_2$ is formed on the surface of the phosphor particle. The thickness of the coating is about 5–10 nm.

Figure 2:
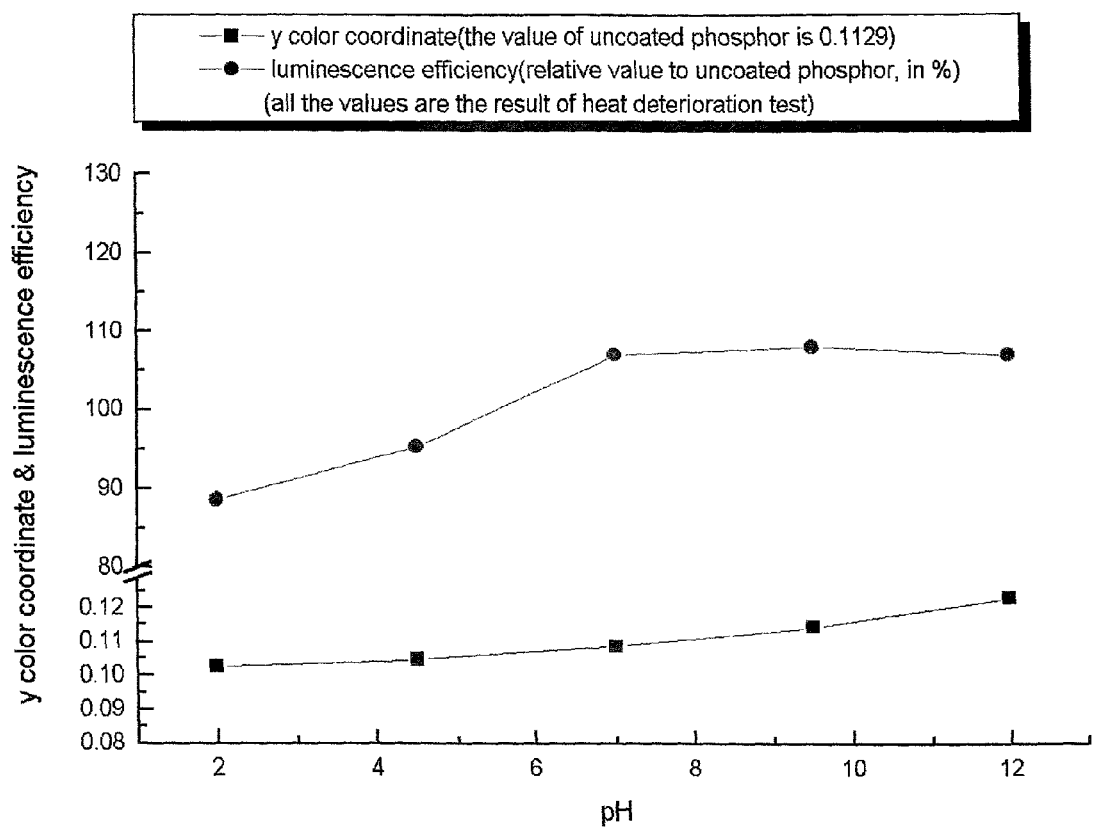
FIG. 2 is a graph of the optical characteristic of the phosphor versus pH in Example 1 according to the present invention.

FIG. 2 is a graph of the optical characteristic of the phosphors prepared in Example 1. FIG. 2 illustrates the optical characteristic, changes in the y-color coordinate and the luminescence efficiency according to pH, of the phosphors having a silica coating and the optical characteristic of the phosphor not having a silica coating, after a heat deterioration test. As is evident from FIG. 2, the phosphors having a silica coating show a better luminescence efficiency and y-color coordinate value in comparison with the phosphor not having a silica coating, especially near the neutral pH region.

EXAMPLE 2

The phosphor was coated in the same manner as in Example 1, with the exception that the amount of TEOS was modified and the pH of the solution was set to 7.0. The amount of TEOS was modified such that the amount of the coating of $SiO_2$ was adjusted to be 0.5, 1.0, 2.0, 4,0, 6.0, 8.0, and 10.0 wt % with respect to the weight of the phosphor.

Figure 3:
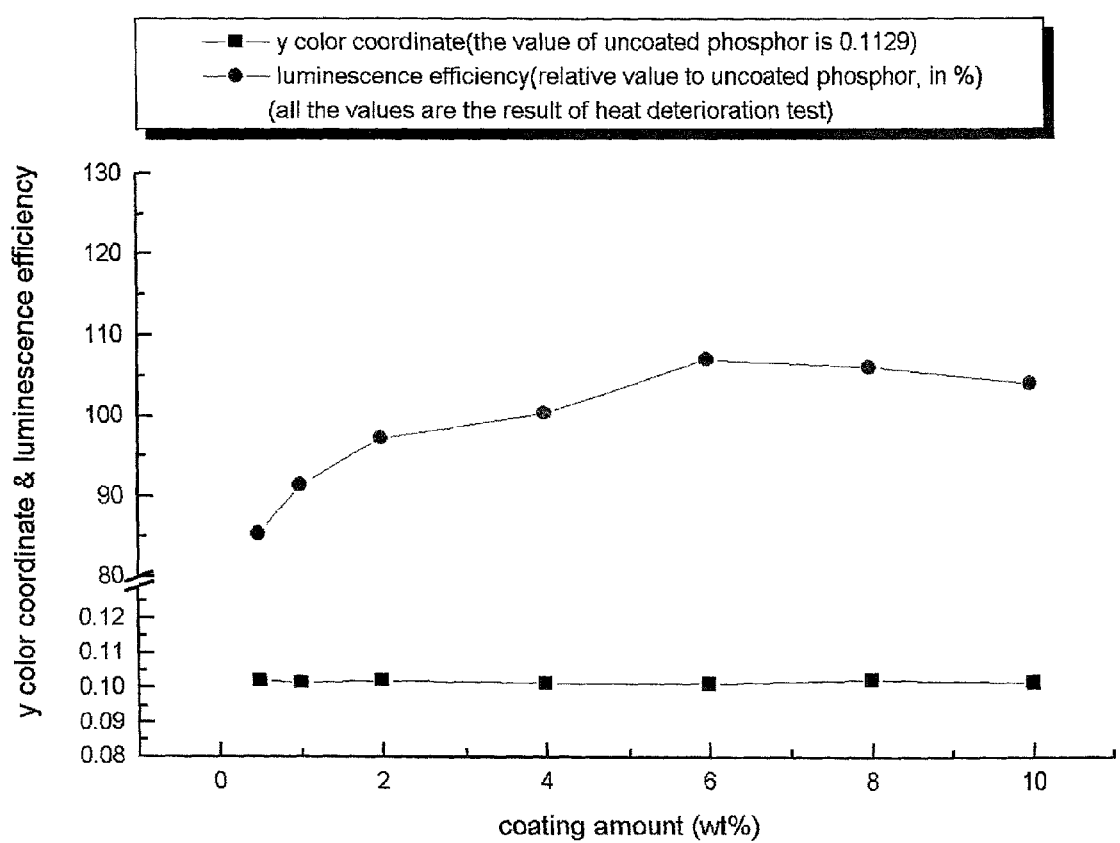
FIG. 3 is a graph of the optical characteristic of the phosphor versus coating amount in Example 2 according to the present invention.

FIG. 3 is a graph of the optical characteristic of the phosphors prepared in Example 2. FIG. 3 illustrates the optical characteristic, changes in the y-color coordinate and the luminescence efficiency according to the amount of the $SiO_2$ coating, of the phosphors having a silica coating, in comparison with the optical characteristic of the phosphor not having a silica coating, after a heat deterioration test. As shown in FIG. 3, the luminescence efficiency varies depending on the amount of coating, but the y-color coordinate value is improved substantially. When considering the luminescence efficiency and the y-color coordinate value, it can be seen that the optimal amount of coating is more or less 6 wt %. When the amount of $SiO_2$ is 10% wt, the thickness of the coating is about 25 nm, thereby realizing a thin coating suitable as a protective layer.

EXAMPLE 3

The phosphor was coated in the same manner as in Example 1, with the exception that the annealing temperature was modified to be 400, 600, 900, and 1200° C. and the pH of the solution was set to 7.0.

Figure 4:
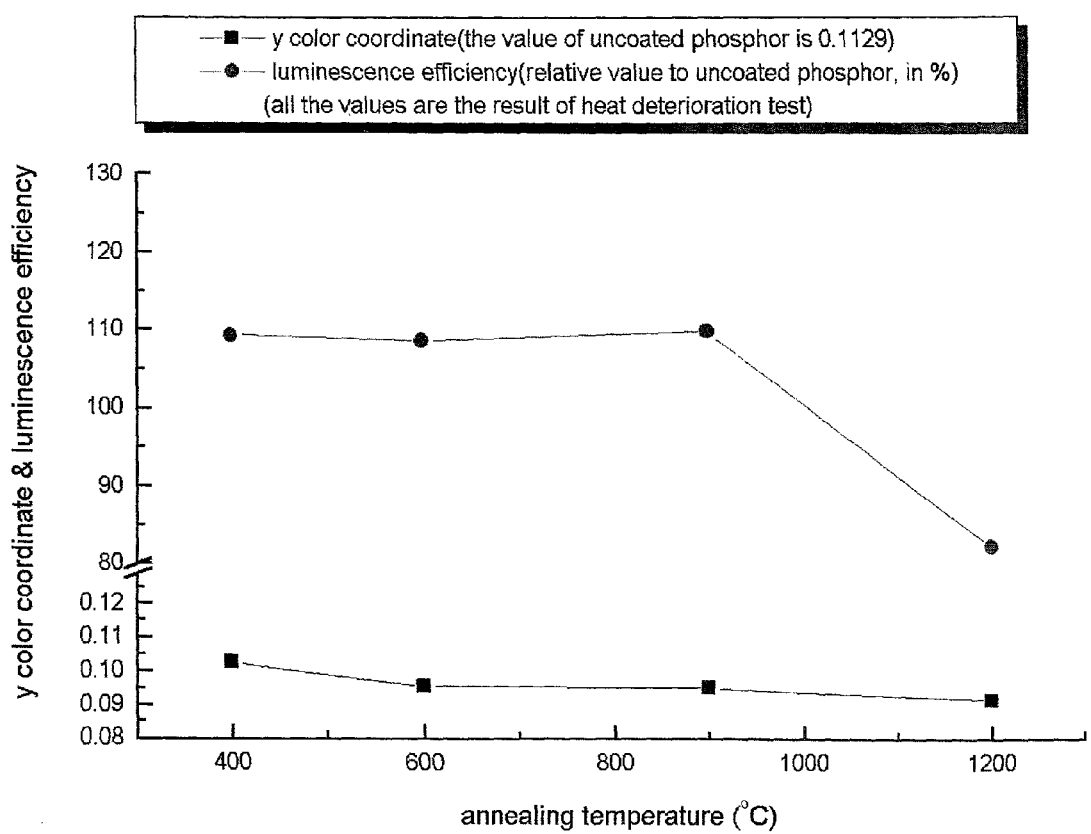
FIG. 4 is a graph of the optical characteristic of the phosphor versus annealing temperature in Example 3 according to the present invention.

FIG. 4 is a graph of the optical characteristic of the phosphors prepared in Example 3. FIG. 4 illustrates the optical characteristic, changes in the y-color coordinate and the luminescence efficiency according to the annealing temperature, of the phosphors having a silica coating, in comparison with the optical characteristic of the phosphor not having a silica coating, after a heat deterioration test. As shown in FIG. 4, the higher the annealing temperature, the better the y-color coordinate value and the worse the luminescence efficiency. But, when these two facts are considered, it can be seen that the optimal annealing temperature is about 900° C.

EXAMPLE 4

The phosphor coated with alumina was manufactured in the same manner as in Example 1, with the exception that 7.5 g of aluminum sec-butoxide was used instead of 12 g of TEOS, the annealing temperature was 800° C., and the pH of the solution was adjusted to 0.5, 2.0, 3.5, 5.0, and 6.5 using nitric acid instead of acetic acid.

Figure 5:
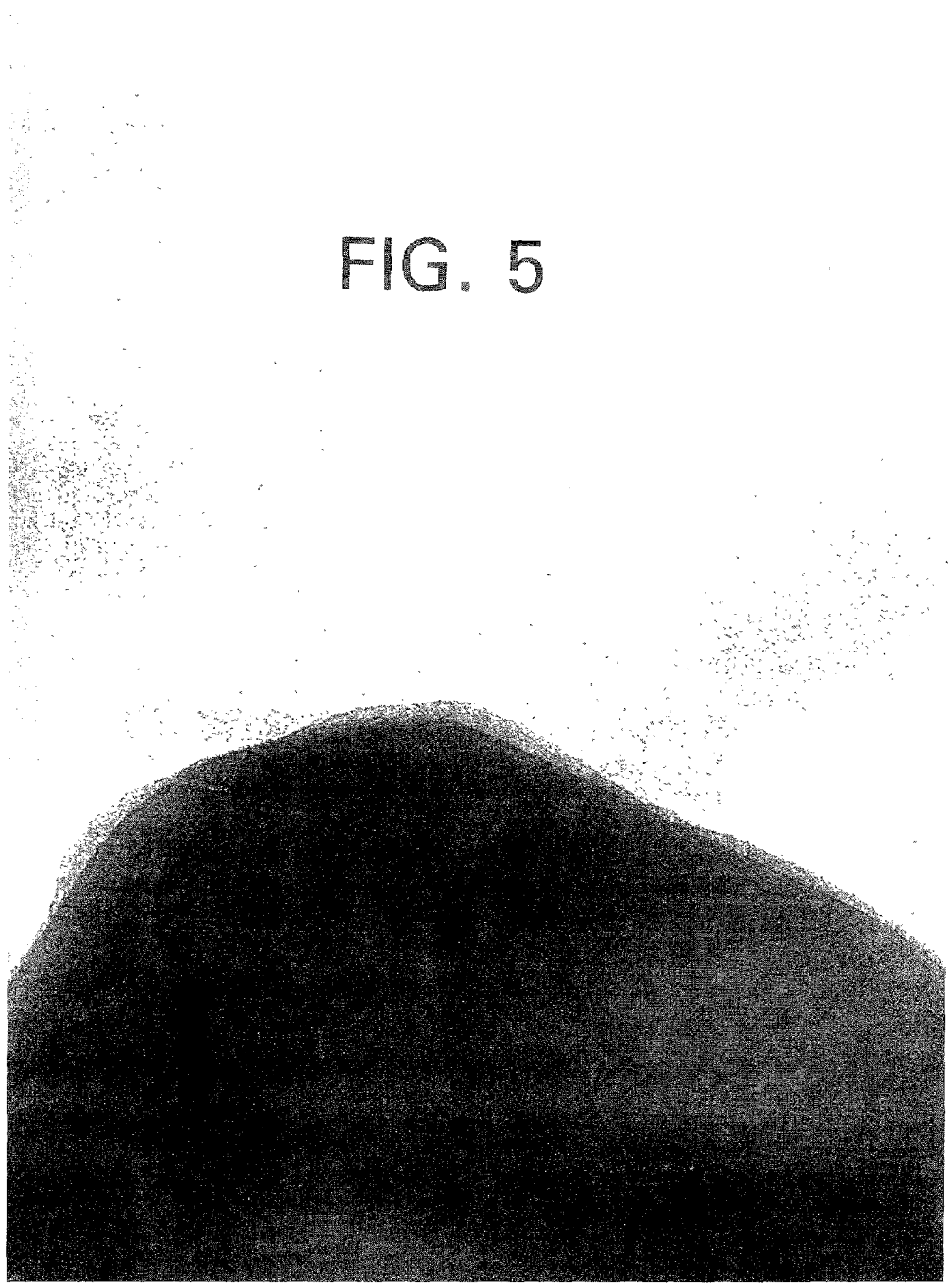
FIG. 5 is a TEM analysis photograph of the phosphor prepared in Example 4 according to the present invention.

FIG. 5 is a TEM analysis photograph of the phosphor coated at a pH of 2.0. The darker portion denotes the phosphor particle. It was confirmed that a continuous, thin film coating of $Al_2O_3$ was formed on the surface of the phosphor particle. The thickness of the coating was about 5–10 nm.

Figure 6:
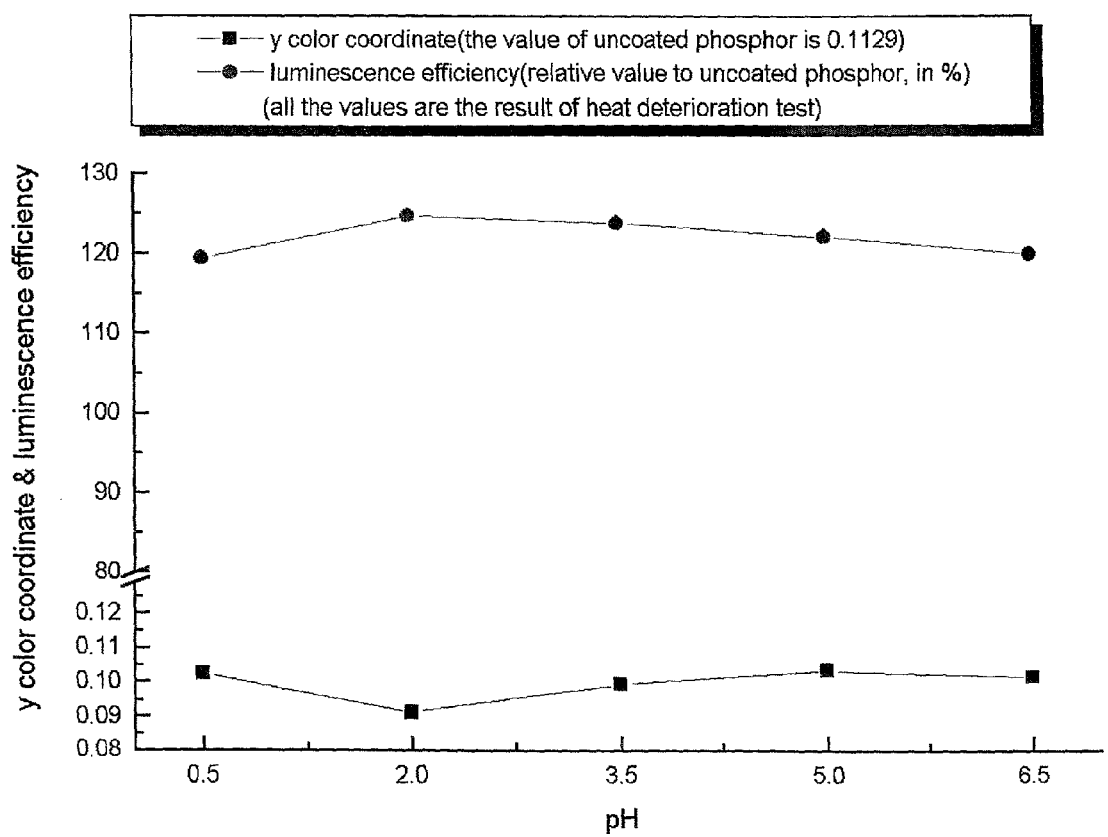
FIG. 6 is a graph of the optical characteristic of the phosphor versus pH in Example 4 according to the present invention.

FIG. 6 is a graph of the optical characteristic of the phosphors prepared in Example 4. FIG. 6 illustrates the optical characteristic, changes in the y-color coordinate and the luminescence efficiency according to pH, of the phosphors having an alumina coating, in comparison with the optical characteristic of the phosphor not having an alumina coating, after a heat deterioration test. As is evident from FIG. 6, the phosphors having an alumina coating show better luminescence efficiency and y-color coordinate property than the phosphor not having an alumina coating, especially near a strongly acidic pH of 2.0.

EXAMPLE 5

The phosphor was coated in the same manner as in Example 1, with the exception that the amount of aluminum sec-butoxide was modified and the pH of the solution was set to 2.0. The amount of aluminum sec-butoxide was modified such that the amount of the coating of $Al_2O_3$ was adjusted to be 3.0, 5.0, and 7.0 wt % with respect to the weight of the phosphor.

Figure 7:
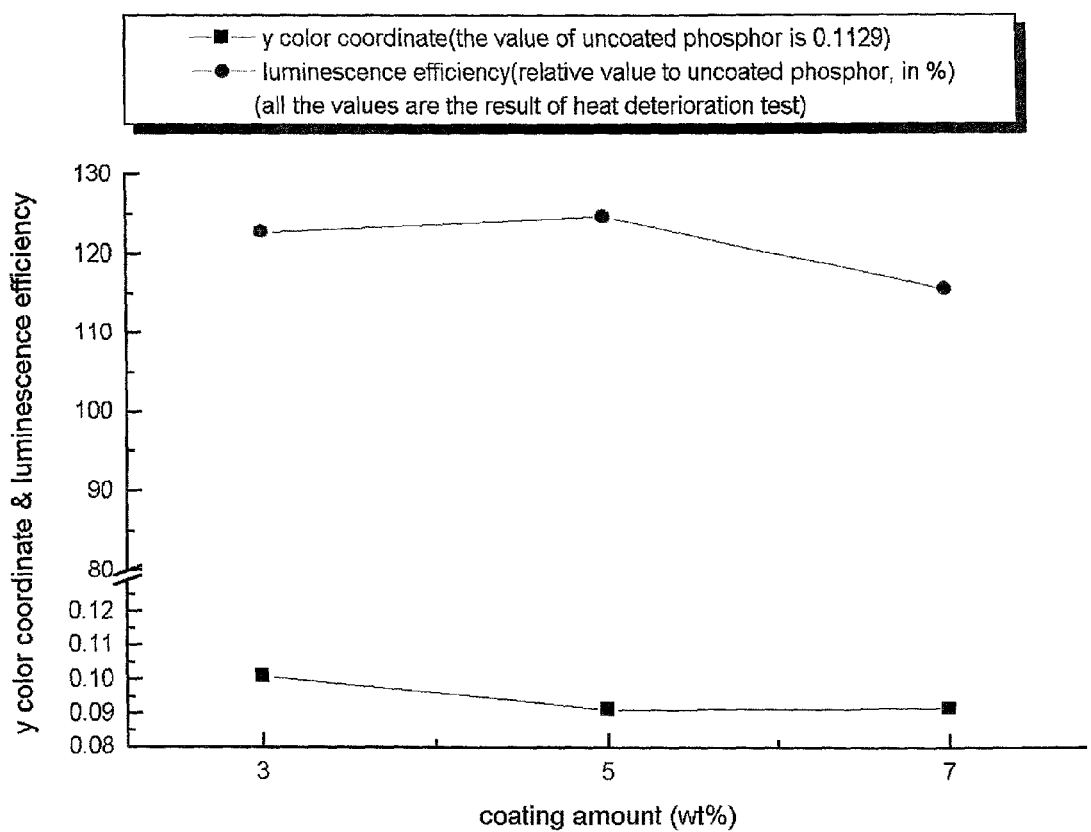
FIG. 7 is a graph of the optical characteristic of the phosphor versus a coating amount in Example 5 according to the present invention.

FIG. 7 is a graph of the optical characteristic of the phosphors prepared in Example 5. FIG. 7 illustrates the optical characteristic, changes in the y-color coordinate and the luminescence efficiency according to the amount of the $Al_2O_3$ coating, of the phosphor having an alumina coating, in comparison with the phosphor not having an alumina coating, after a heat deterioration test. As shown in FIG. 7, the luminescence efficiency varies depending on the amount of coating, but the y-color coordinate value is improved substantially. When considering the luminescence efficiency and the y-color coordinate value, it can be seen that the optimal amount of coating is about 5% optimally.

EXAMPLE 6

The phosphor was coated in the same manner as in Example 1, with the exception that the annealing temperature was modified to be 600, 800, 1000, and 1200° C. and the pH of the solution was set to 2.0

Figure 8:
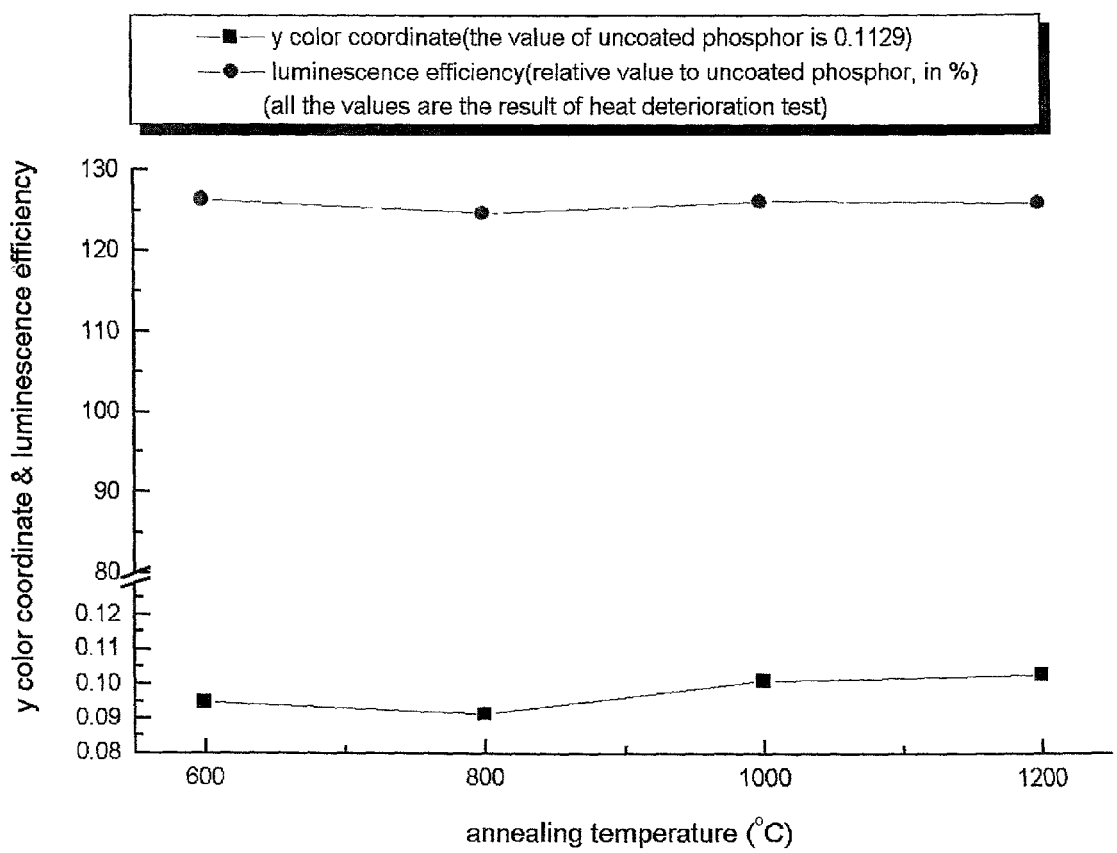
FIG. 8 is a graph of the optical characteristic of the phosphor versus sintering temperature in Example 6 according to the present invention.

FIG. 8 is a graph of the optical characteristic of the phosphors prepared in Example 6. FIG. 8 illustrates the optical characteristic, changes in the y-color coordinate and the luminescence efficiency according to the annealing temperature, of the phosphors having an alumina coating, in comparison with the optical characteristic of the phosphor not having an alumina coating, after a heat deterioration test. As shown in FIG. 8, the luminescence efficiency is improved by more than 25%, and the y-color coordinate is also improved. But if the annealing temperature is too high, then it is not preferable since the y-color coordinate value tends to increase.

The phosphor coated with 6% wt of $SiO_2$ in Example 1 and the phosphor coated with 5% wt of $Al_2O_3$ in Example 4 are deposited on PDPs, respectively, and the lifetimes of the phosphors were measured after the PDPs were operated. When the PDP was operated at 170 V for 1000 hours, the lifetimes of the phosphors coated with $SiO_2$ and $Al_2O_3$ were improved about 10% compared to phosphor not coated with $SiO_2$ or $Al_2O_3$. Accordingly, a continuous, thin film according to the present invention not only serves as a protective layer, but also improves the efficiency of the phosphor within a panel of a PDP.

As described above, by forming a continuous, thin film of wide bandgap metal oxide on the phosphor for a PDP using a sol-gel process, the lifetime characteristic of the phosphor is improved about 10% when the PDP was operated for 1000 hours, and an optical characteristic can be reduced.

Although a several preferred embodiments of the present invention have been shown and described, it would be appreciated by those skilled in the art that changes might be made in this embodiment without departing from the principles and spirit of the present invention, the scope of which is defined in the claims and their equivalents.

What is claimed is:

1. A material suitable for use in a plasma display panel (PDP), comprising:
   a sintered phosphor; and
   a crystalline wide bandgap metal oxide prepared from a precursor solution comprising aluminum alkoxide, the aluminum alkoxide having an alkyl substituent of 1 carbon to about 6 carbons, wherein a continuous coating comprising the crystalline wide bandgap metal oxide having a thickness in the range of about 1 nm to about 40 nm is arranged on the phosphor by sintering.

2. A material suitable for use in a plasma display panel (PDP), comprising:
   a sintered blue phosphor $BaMgAl_{10}O_{17}$:Eu; and
   a crystalline wide bandgap metal oxide prepared from a precursor solution comprising aluminum alkoxide, the aluminum alkoxide having an alkyl substituent of 1 carbon to about 6 carbons;
   wherein a continuous coating comprising the crystalline wide bandgap metal oxide having a thickness in the range of about 1 nm to about 40 nm is arranged on the surface of the phosphor by sintering the phosphor.

3. A material suitable for use in a plasma display panel (PDP), comprising:
   a sintered phosphor; and
   a crystalline wide bandgap metal oxide prepared from a precursor solution comprising aluminum alkoxide, the aluminum alkoxide having an alkyl substituent of 1 carbon to about 6 carbons,
   wherein a continuous coating comprising the crystalline wide bandgap metal oxide having a thickness in the range of about 1 nm to about 40 nm is formed on the surface of the phosphor by a sol-gel process by sintering the phosphor.

4. A material suitable for use in a plasma display panel (PDP), comprising:
   a sintered blue phosphor $BaMgAl_{10}O_{17}$:Eu; and
   a crystalline wide bandgap metal oxide prepared from a precursor solution comprising aluminum alkoxide, the aluminum alkoxide having an alkyl substituent of 1 carbon to about 6 carbons,
   wherein a continuous coating comprising the crystalline wide bandgap metal oxide having a thickness in the range of about 1 nm to about 40 nm is formed on the surface of the phosphor by a sol-gel process by sintering the phosphor.

5. The material of claim 1, wherein the continuous coating is formed by a sol-gel process comprising:
   preparing the precursor solution comprising aluminum alkoxide, the precursor solution further comprising an organic solvent and water;
   adjusting the acidity of the precursor solution to obtain a pH in a range of about 0.1 to about 10;
   heating the precursor solution having the pH in a range of about 0.1 to about 10 under a reflux to hydrolyze the metal hydroxide precursor to produce a metal hydroxide sol;
   contacting the phosphor with the heated precursor solution to produce a gel-coated phosphor; and
   drying the gel-coated phosphor to produce a dried gel-coated phosphor; and
   sintering the dried gel-coated phosphor,
   wherein the sintered dried gel-coated phosphor is suitable for use in a PDP.

6. The material of claim 5, wherein the organic solvent comprises an alcohol.

7. The material of claim 5, wherein hydrolysis is accomplished by adding an acid or a base to the precursor solution.

8. The material of claim 7, wherein the base is at least one selected from the group consisting of ammonia, ammonium hydroxide, and urea.

9. The material of claim 7, wherein the acid is at least one selected from the group consisting of acetic acid, nitric acid, and hydrochloric acid.

10. The material of claim 5, wherein the dried gel-coated phosphor is sintered at a temperature in the range of about 400° C. to about 1200° C.

11. The material of claim 5, wherein the pH of the precursor solution is adjusted such that a continuous and smooth coating having a thickness in the range of about 1 nm to about 40 nm is formed on the surface of the phosphor.

12. The material of claim 5, wherein the dried gel-coated phosphor is sintered at a temperature in the range of about 250° C. to about 1200° C.

13. The material of claim 12, wherein the dried gel-coated phosphor is sintered at a temperature in the range of about 400° C. to about 900° C.

14. The material of claim 5, wherein the continuous coating has a thickness at or between 1 nm and 40 nm.

15. The material of claim 14, wherein the continuous coating has a thickness at or between 3 nm and 20 nm.

16. The material of claim 1, wherein the size of particles of the sintered phosphor ranges from 0.01 μm to 5 μm.

17. The material of claim 2, wherein the size of particles of the sintered blue phosphor $BaMgAl_{10}O_{17}$:Eu ranges from 0.01 μm to 5 μm.

18. The material of claim 3, wherein the size of particles of the sintered phosphor ranges from 0.01 μm to 5 μm.

19. The material of claim 4, wherein the size of particles of the sintered blue phosphor $BaMgAl_{10}O_{17}$:Eu ranges from 0.01 μm to 5 μm.

* * * * *